Patented Nov. 11, 1930

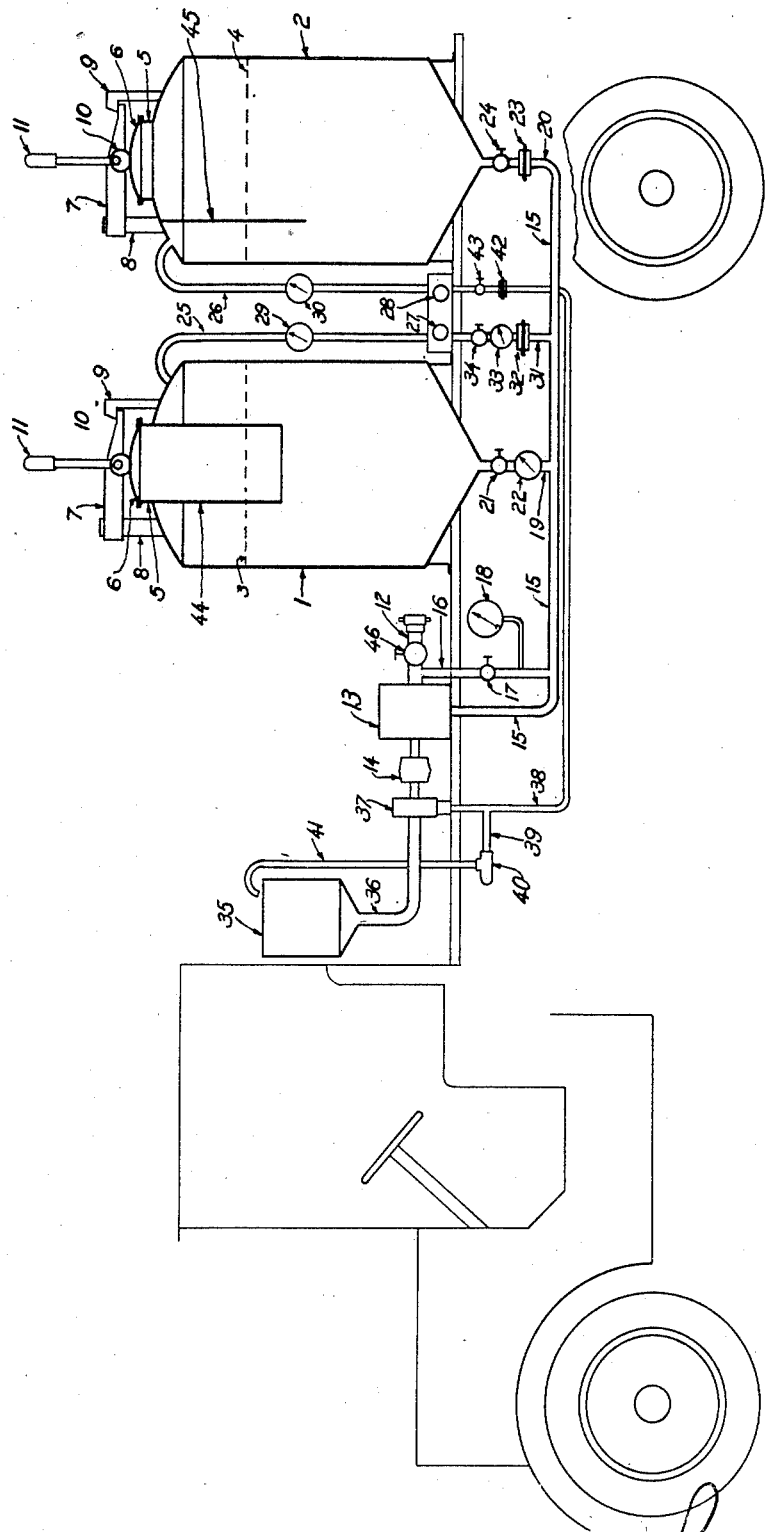

1,781,299

UNITED STATES PATENT OFFICE

PAUL W. PRUTZMAN, OF LOS ANGELES, CALIFORNIA

CONTINUOUS PRODUCTION OF FOAM SOLUTIONS

Application filed September 28, 1927. Serial No. 222,568.

The art of extinguishing fires in general, and particularly oil fires, by means of "Foamite" or "Firefoam" is very well known and understood. It consists in bringing together, in solution, the following constituents: (a) aluminum sulfate containing 18 molecules water of crystallization, hereinafter referred to as "alum"; (b) hydrogen sodium carbonate, commonly termed sodium bicarbonate or baking soda, hereinafter referred to as "soda", and (c) a substance having the property of increasing the surface tension of aqueous liquids, such for instance as glue or extract of licorice, hereinafter referred to as "licorice".

By admixture of these substances in solutions of the proper strength and in correct proportions, a very dense and tenacious foam is produced which, as it consists mainly of water and carbon dioxid and is light enough to float on oil, is a highly efficacious and valuable agent for extinguishing fires.

It has heretofore been the custom either to prepare the solutions in advance and to store them until needed, distributing them at such times (by means of duplicate lines) to the points where foam may be required, or to store small quantities of the solutions in pressure tanks mounted on wheels, which can be taken to the seat of the fire. In the first case the stored solutions are delivered by stationary pumps, often for long distances, through a fixed distributing system and against high back pressures if the seat of the fire is far from the pumping plant. In the second the foam is produced inside the engine and is delivered by the pressure resulting from the generation of carbon dioxid inside the tank.

The first system is disadvantageous in that the fixed investment is very large, amounting to hundreds of thousands of dollars for the protection of a large plant such as an oil refinery or tank farm. Further, the capacities of the solution tanks, no matter how large they may be, are definitely limited, and the time required for recharging them quite extended. It has often occurred that such tanks have become exhausted during the course of a stubborn fire, and that before they could be refilled the fire had gotten quite out of hand. The second system is disadvantageous in that the output of foam from the largest unit which is actually portable is so trifling that these portable tank units can take care of only the smallest fires.

An object of my invention is to provide a cheap and effective means for the continuous production of solutions of the foam chemicals from their dry salts, thus doing away with the requirement for any storage of solution and minimizing or avoiding a possible failure of solution supply during the course of a fire. While the supply of foam chemicals comprised in the original charge of the apparatus is not indefinite it is, for any given size of tank, very large as compared to the supply in an ordinary solution tank, the latter containing mostly water. Further, the addition of a renewed supply and the reestablishment of service is a matter of a few seconds only instead of the much longer time required for recharging the usual solution tanks.

In this view of my invention it is adapted to be used in connection with an existing system of distributing lines, replacing the solution tanks and being advantageous mainly in supplying ten or more times as much solution from a unit of given size before recharging is required.

A further object of my invention is to supply a simple and effective portable apparatus which can be taken to the seat of the fire and there, being supplied solely with water, will supply for an extended period separate streams of the two solutions, which can be separately conducted to the actual fire through short lines and there intermixed by any preferred type of mixing head.

A further, and perhaps the most important object of my invention is to provide a strictly automatic means which, when supplied with water at a velocity which may be varied at will, and without any further regulation or control whatever, will continue to deliver streams of solutions exactly proportioned as to both quantity and strength to produce the maximum quantity of the most efficient foam without any wastage or loss of chemical.

These advantages and the manner in which they are attained will be evident from the following description of the attached drawing, which diagrammatically illustrates in vertical section a preferred complete embodiment of my invention.

Referring to the drawing, 1 and 2 are tanks for continuously dissolving alum and soda respectively. These tanks are charged with the dry chemicals in powdered form up to a point fairly close to their tops, as for instance to the levels indicated by the dotted lines 3 and 4.

These tanks, when supplied with water as will be described, will deliver saturated solutions of the salts contained therein until the supply of the latter is almost exhausted, and at such time must be refilled. It is important that this refilling operation consume the minimum of time, as during such period the apparatus is out of commission and the flow stopped. I have therefore suggested a form of closure (not a part of my invention) which consists of a manhole collar and ring 5 closed by a loose plate 6, the latter opening on a hinge not shown. A rigid bar 7 rotates loosely on a strong stud 8, the opposite end of such bar engaging the hook-bar 9. A cam 10 is pinned to the bar 7 and on being rotated by the handle 11 tightens or loosens the plate 6, the entire operation of loosening the plate, swinging bar 7 to clear, and folding the plate back on the hinge not shown, occupying but a few seconds. This is a preferred construction only, and any other means for closing the opening 5 may be used in its stead.

Water is supplied to the apparatus through the broken pipe 12, which is connected to any convenient source of supply not shown. In case the water is to be lifted from a reservoir or other supply having no pressure the pump 13 may be used, this pump being driven as by the pulley 14 from any convenient source of power not shown, which in a portable plant may be the engine driving the truck on which the apparatus is mounted. In case a supply under pressure is available over all parts of the area to be protected this pump may be dispensed with, though even in such case the retention of the pump for emergency use is desirable, a by-pass line 16 in which are interposed the control valve 17 and the pressure gauge 18 being used to divert the water around the pump. In either case the water supply is delivered into a water main 15—15.

The water supply to tanks 1 and 2, for dissolving the dry chemicals, is drawn from line 15 through the branch lines 19 and 20. This supply of water must be accurately controlled, and two alternative methods for such control are suggested. In line 19 feeding tank 1 is provided with a control valve 21 and a meter 22, for proper manipulation of the valve and timing of the meter enabling the operator to get exactly the proper rate of flow. I much prefer the arrangement shown beneath tank 2 in which an orifice plate 23 is used to control the quantity of fluid passing through branch line 20, the valve 24 interposed in this line being used merely as a stop valve and not being utilized for control.

It will be understood that one or the other system of control should be used throughout the apparatus and not both systems as indicated in the drawing.

The solutions produced in tanks 1 and 2 are forced out by the pressure of the entering water through the outlet lines 25 and 26 respectively to the two hose outlets 27 and 28, which are equipped with couplings not shown for the attachment of hose or other lines for conveying the solutions to the mixing head. In these lines may be placed the meters 29 and 30 for checking the rates of flow through these lines, but these are not indispensable and may be omitted, particularly if the system of control by means of orifice plates is used.

Into the outlet 27 is also taken a supply of water through the branch line 31, in which is interposed an orifice plate 32, a meter 33 (if desired) and a stop valve 34. The water passing through this line mixes in the delivery hose with the solution passing through line 25 and dilutes it.

Where the solutions are prepared in advance it is customary to add the requisite quantity of licorice to the soda solution, but this cannot be done directly in my method because of the superior solubility of the licorice, which would cause it to be washed out of the mass of solid soda before any great quantity of the latter passed into solution. I therefore provide a small tank 35, open at the top, for holding a supply of licorice, this tank having a bottom outlet pipe 36 entering the suction of a small pump 37. In case a water supply pump is used the licorice pump 37 is connected to and driven by the water pump 13, an arrangement which will function even when the water supply is from an outside source under pressure, as in that case pump 13, which should preferably be a rotary gear pump, will divert a certain amount of water around the control valve 17 and act as a water motor, driving the licorice pump 37 at a sufficient speed. In case no water pump is used the licorice pump must be driven by some source of power not shown, as by the truck engine, either directly or through the battery and a small motor such as a starting motor.

In either case the licorice pump discharges into a pipe 38, from which is taken a branch line 39 discharging into a relief valve 40 which in turn discharges through a pipe 41 into the top of tank 35. By this means a constant pressure is kept on pipe 38, which in turn discharges licorice solution into the outlet opening 28 through the orifice plate 42 and the stop valve 43. This solution mixes in said outlet with the soda solution produced in tank 2 and discharges therefrom through pipe 26.

When refilling tanks 1 and 2 with powdered chemicals it is desirable to protect the solution outlets 25 and 26 as otherwise they might become clogged with floating powders held up by entrained air. I therefore show two alternative methods for introducing powder, either of which or any other preferred method may be used. In tank 1 I extend the manhole collar 5 downward into the tank, as indicated at 44. In tank 2 I place a plate indicated at 45 opposite the outlet 26, making it fast to and a fair fit against the shell and top of the tank. These methods are precautionary only and may be dispensed with.

In case the water pump 13 is not provided, or is allowed to idle for pumping licorice, it is desirable to place in the water inlet 12 a control valve by which the pressure on the orifice plates may be kept at a desired point, and by means of which the apparatus may be shut down when no longer required.

Before describing the operation of my apparatus it should be stated that the fire extinguishing foam is produced by the admixture of the chemicals above named (alum, soda and a stabilizer such as licorice) together with a quantity of water which has been shown by experience to produce the most desirable quality and quantity of foam. Using this total quantity of water and the correct proportions of each chemical, it makes no particular difference how the water is distributed between the three solutions, provided only that enough water is used with any one chemical to keep it in complete solution. However, when using an outside-mixing head (such as the "misting spray nozzle" described and claimed by James A. McCracken in his application filed June 24th, 1927, under Serial No. 201,134) it is to be preferred that the two solutions reach the mixing head in streams of substantially equal volume and pressure, as the heads are thus caused to function most efficiently as mixing and distributing agents.

The ratio of alum to soda is determined by a definite chemical reaction and is thus a fixed ratio. The ratio of stabilizer to volume of solution has also been fairly well fixed by repeated experiment. But the quantity of water which may be incorporated in the foam is a matter of opinion, and depends to a great extent on the manner in which the foam proper (as distinguished from its constituents) is produced and transported. In other words, the water is a diluent of the foam, and if the latter can be prevented from breaking down and resolving itself into its constituents during the periods intervening between the manufacture of the original solutions and the application of the foam to the fire, a smaller proportion of the reagents will be required to produce unit volume of final foam yield, and by consequence the foam will be lighter and more certain to float on burning oil.

The proportions of chemicals which I prefer to use are therefore less than is considered desirable in standard practice, this reduction in consumption of chemicals being one of the advantages of my novel method of making and using the solutions. It will be understood, however, that my invention is not limited to the proportions stated, nor even to the particular chemicals stated, but only to such chemicals and such proportions thereof as will produce a satisfactory fire extinguishing foam.

I prefer to use in the production of each 100 gallons of total solution the following quantities: alum, 60 pounds; soda, 35 pounds; licorice (on the dry basis, 5 pounds.)

The commercial stablizers such as licorice come onto the market in the form of viscous liquids or pastes containing approximately one part by weight of the dry extract to two parts by weight of water, and as such paste is too thick to measure accurately by my method I prefer to dilute it with three parts of water prior to use.

The rationale or my invention is to first produce saturated solutions of the two salts, alum and soda, these saturated solutions having, within a reasonable range of temperature, a practically constant composition, so that a definite weight of each salt may be measured out by measuring the corresponding volume of saturated solution or of the water required to make such saturated solution. The saturated solutions so measured out are kept separate as above shown. I then add to one or the other of these solutions, preferably to the soda, the requisite quantity of licorice, this also being in the form of a quantitative solution. Finally, I add to one or the other (or both) of the above solutions the quantity of water required to make up the total volume. It will be understood that in actual operation these steps are not taken in sequence, but are continuous and coincident, the measurement of the four liquids being made by forcing the four streams (one of diluted licorice and three of water) either through control valves set by means of meter readings, or preferably through orifice plates as above described.

As an illustration of the manner in which the respective quantities of the four liquids are calculated, I may use the proportions of reagents to volume of solution above given, the calculations for other desired proportions being made in the same manner.

At approximately 70° F., 100 parts by weight of water dissolve 107 parts by weight of alum, producing 207 parts by weight of a saturated solution having the specific gravity 1.34.

At the same temperature 100 parts by weight of water dissolve 11 parts by weight of soda, producing 111 parts by weight of a saturated solution having the specific gravity 1.03.

100 parts by weight of commercial licorice paste contain approximately 33 parts by weight of dry extract of licorice and 67 parts by weight of water, the specific gravity of the paste being approximately 1.50.

From the above figures we derive the weights and volumes required to produce 100 gallons total solution.

```
60# alum requires 56# water—  6.7 gals.—sol.  9.0 gal.
35# soda requires 318# water—38.3 gals.—sol. 41.2 gal.
5# dry licorice—15# paste—  1.2 gals.
3 parts water to dilute paste—  3.6 gals.—sol.  4.8 gal.
Water required to complete quantity        45.0 gal.
```

From this we derive the quantities to be measured, these being:

```
Water to tank 1 (meter or plate 22)--------  6.7 gallons
Water to tank 2 (plate 23)-----------------  38.3 gallons
Water to outlet 27 (plate 32)-------------- 45.0 gallons
Licorice to outlet 28 (plate 42)------------  4.8 gallons
```

If we thus bring together the alum solution and the make-up water we have 54.0 gallons of diluted alum solution. If we likewise bring together the soda solution and the diluted licorice we have 46.0 gallons of soda solution containing enough excess water (comprised in the diluted licorice) to safely maintain the soda in solution. The two solutions thus compounded reach the mixing head in proportions close enough to the nominal 50—50 to ensure proper action of the head.

Plates passing the relative quantities above set forth under a uniform pressure difference may readily be constructed, though they can be only roughly calculated and should be finished by reaming and trial. If it is anticipated that the apparatus will be required to operate over any wide range of delivery rate the material of the plates should be thin, to permit them to maintain the established ratio of delivery over a wide range of pressure difference.

The operation of my apparatus is as follows. The tanks 1 and 2 are charged with chemical up to about three quarters of their height, and the closures replaced. If, for example, these tanks are made say 3' in diameter by 5' 6" high, the useful charge (allowing one-eighth of the total capacity for retention in the tanks to prevent dilution at the end of the run) will be about one ton, which will permit the operation of the apparatus at a total solution delivery rate of 400 gallons per minute for a little over one half hour. This quantity of solution will produce about 4,000 gallons of foam per minute, enough to care for a fire of the first magnitude.

The apparatus being taken to a point reasonably adjacent to the fire, a water connection is made to the line 12, appropriate hose or pipe connections for separately conveying the solutions to the fire are made to the outlets 27 and 28, and the tank 35 is filled with diluted licorice solution. The valves 21, 24, and 43 being wide open (if orifice plates are provided) or partly opened (if meter control is used), valve 46 in the water inlet line is opened and the water pump 13 (if such is provided) is started and the pump brought to speed. The licorice pump is also started and brought to speed, this being the speed of the water pump if the two are direct coupled, or if separately driven is the speed at which a small excess supply of licorice is continuously returned to tank 35 through line 41.

The proper speed for the water pump is that at which the desired quantity of total solution is delivered to the mixing head. In case the water pump is provided, but is not used because of an available supply of water under pressure, valve 17 in line 16 is opened until sufficient pressure is indicated on the gauge 18, or until a sufficient supply of solution is being delivered.

If orifice plates are provided as a means of control the apparatus is now in full operation and will require no further attention except to see that tank 35 is replenished from time to time. It will operate thus until the supply of chemicals is exhausted.

If control valves and meters are provided instead of orifice plates the apparatus will not function with economy of chemicals until the five valves 46, 21, 34, 43 and 24 are brought into relative adjustment. That is to say, valve 46 is readjusted to maintain a substantially constant pressure on pressure gauge 18 while valves 21, 34, 43 and 24 are adjusted by meter readings to give the delivery required of each.

Such adjustment, which with globe or gate valves might be very tedious, may be facilitated by substituting stop cocks provided with handles and with rather wide dial plates and pointers thereon. The adjustment once made may then be noted by the readings on the dials and returned to at will by using the previous settings. The cocks used for this purpose may be plain but are preferably slotted in a V form, in the well known manner.

I claim as my invention:

A continuous foam producer in combination with a vehicle including closed vessels, a main water line having a pressure pump, a water feed line disposed below said vessels, branch lines having predetermined pressure controllable means communicating with said feed line and vessels, an open supply licorice vessel above the main line, a licorice pressure pump having a depending discharge pipe including a relief valve operatively associated with said licorice pressure pump, a delivery pipe joining said relief valve and in open communication with said licorice vessel, a by-pass having predetermined pressure controllable means interposed between the main water and feed lines, outlet lines including meters communicating with the upper portion of said closed vessels, a diluting branch pipe including predetermined pressure controllable means in communication with one of the outlets, a licorice feed supply line co-acting with said licorice pump and connecting with the other of said outlet lines, said closed vessels including a barrier precluding cloggage of said lines, locking means whereby said vessels are closed seal tight and means for actuating said pumps.

In witness that I claim the foregoing I have hereunto subscribed my name this 20th day of September, 1927.

PAUL W. PRUTZMAN.